(12) United States Patent
Hong et al.

(10) Patent No.: US 9,207,447 B2
(45) Date of Patent: Dec. 8, 2015

(54) CELL DRIVEN BY ELECTRIC FIELD AND OPERATION METHOD THEREOF

(75) Inventors: Mun Pyo Hong, Seongnam-Si (KR); Hong Choi, Jeollanam-do (KR); Hyo Joo Park, Busan (KR); Ho Won Yoon, Seoul (KR)

(73) Assignee: KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 245 days.

(21) Appl. No.: 13/883,406

(22) PCT Filed: Nov. 7, 2011

(86) PCT No.: PCT/KR2011/008414
§ 371 (c)(1),
(2), (4) Date: Oct. 1, 2013

(87) PCT Pub. No.: WO2012/064057
PCT Pub. Date: May 18, 2012

(65) Prior Publication Data
US 2014/0016174 A1    Jan. 16, 2014

(30) Foreign Application Priority Data
Nov. 8, 2010  (KR) .................. 10-2010-0110671

(51) Int. Cl.
G02B 26/00 (2006.01)
G02F 1/167 (2006.01)

(52) U.S. Cl.
CPC .............. G02B 26/00 (2013.01); G02B 26/004 (2013.01); G02F 1/167 (2013.01)

(58) Field of Classification Search
CPC .. G02B 26/0841; G02B 26/001; G02B 26/00; G02B 26/004; G02F 1/167
USPC .................................................. 359/290–297
See application file for complete search history.

(56) References Cited

U.S. PATENT DOCUMENTS

| 2002/0044333 A1* | 4/2002 | Shigehiro et al. | 359/296 |
| 2011/0063259 A1* | 3/2011 | Lee et al. | 345/204 |
| 2011/0210909 A1* | 9/2011 | Yi et al. | 345/55 |

* cited by examiner

*Primary Examiner* — Scott J Sugarman
*Assistant Examiner* — Kristina Deherrera
(74) *Attorney, Agent, or Firm* — Lex IP Meister, PLLC

(57) ABSTRACT

There is provided a cell driven by an electric field including a first electrode and a second electrode spaced from each other and an actuator moving between the first electrode and the second electrode. The actuator does not have permanent electric charges and a DC voltage or a pulse voltage is applied to the first electrode and the second electrode.

22 Claims, 4 Drawing Sheets

CELL DRIVEN BY ELECTRIC FIELD AND OPERATION METHOD THEREOF

TECHNICAL FIELD

The present disclosure relates to a cell driven by an electric field, which can be used in an electronic paper display, and an operation method thereof.

BACKGROUND ART

Recently, researches and development of various electronic paper displays have been in progress and, thus, a commercial electronic paper becomes available.

There are some representative examples of an electronic paper display as follows: (1) an electrophoretic type (E-Ink, SiPix) in which electrically charged pigment particles confined in a microcapsule or not are mixed with oil and move in response to application of an electric field; (2) a twist ball type (Gyricon media) in which spherical particles formed of upper and lower hemispheres having opposite charges and different colors are rotated by an electric field; (3) a QR-LPD (Quick Response-Liquid Powder Display) type (Bridgestone) in which electrically charged liquid powder is operated under dry circumstances; and (4) a cholesteric liquid crystal display type (Kent Display) using a selective reflection property of cholesteric liquid crystal molecules.

Among them, the electrophoretic type is the most typical type of an electronic paper display. Particles used in a conventional electronic paper display such as an electrophoretic display have permanent electric charges. However, the particles having permanent electric charges may be disadvantageous in that they require a high driving voltage and they have a low response speed, and they have difficulty in expressing gradations. Further, a color filter is needed to express colors.

DISCLOSURE OF INVENTION

Solution to Problem

The present disclosure is developed to solve the above-described problems of conventional technologies, and the present disclosure provides electric-field-driven cell using an actuator which does not have permanent electric charges and an operation method thereof.

In accordance with one aspect of the present disclosure, there is provided a cell driven by an electric field. The cell may include a first electrode and a second electrode spaced from each other and an actuator moving between the first electrode and the second electrode. The actuator does not have permanent electric charges, and a DC voltage or a pulse voltage is applied to the first electrode and the second electrode.

A position of the actuator may be controlled by adjusting magnitude of the DC voltage applied to the first or second electrode or at least one of magnitude, an electric potential change speed, a waveform of a pulse, and duration of a pulse of the pulse voltage applied to the first or second electrode. The cell may further include a controller which controls the magnitude of the DC voltage applied to the first or second electrode or the magnitude, the electric potential change speed, the waveform of the pulse, and the duration of the pulse of the pulse voltage applied to the first or second electrode.

The present disclosure provides an electric-field-driven cell which adjusts a position of the actuator by applying a DC voltage or a pulse voltage to electrodes or adjusting an electric potential change speed.

The actuator of the present disclosure does not have permanent electric charges and can be positively or negatively charged for a required time period depending on an electric potential applied to its adjacent electrode.

If the actuator is formed into a spherical shape or a cylindrical shape and charged with electricity by the electrode in contact with it, the electrode and the actuator may have a high contact resistance depending on a contact area and a contact state therebetween, so that it is possible to adjust the actuator to be in an electrically charged state or an insulated state.

The actuator may include an insulating base coated with a conductive material or a semiconductor material. Further, the actuator may include an insulating base, a color layer coating the insulating base, and a transparent conductive layer coating the color layer.

Further, the actuator may entirely be formed of a semiconductor material such as metal oxide or silicon. The actuator formed of such a semiconductor material may have induced charges on its surface depending on an electric field applied thereto, and, thus, it may have substantially the same characteristics as the spherical body coated with the conductive material.

In the electric-field-driven cell of the present disclosure, the first electrode and the second electrode may be brought into direct contact with the actuator. Alternatively, the cell may further include an insulating layer by which the first electrode and the second electrode are not brought into contact with the actuator.

Alternatively, the cell may further include an insulating layer by which one of the first and second electrodes is not brought into contact with the actuator. If only one electrode is brought into contact with the actuator, a control electrode may be additionally provided on the side of the electrode in contact with the actuator.

The first electrode and the second electrode may be respectively placed on separate substrates facing each other and the first electrode and the second electrode may be positioned so as not to face each other. The actuator may be positioned in a driving space formed between the two substrates facing each other and may move between the first electrode and the second electrode. Further, an upper substrate on which the first electrode is placed and the first electrode may be made of transparent materials and a light absorption layer may be formed at a portion of the upper substrate on which the first electrode is not placed. A light absorption layer may be formed on an overall lower substrate on which the second electrode is placed. Alternatively, an upper substrate on which the first electrode is placed may be made of a transparent material, and a light absorption layer may be formed at a portion of the upper substrate on which the first electrode is placed.

In accordance with another aspect of the present disclosure, there is provided an electric-field-driven device including a plurality of the above-mentioned cells.

The electric field-driven device may be a display device. Further, electric-field-driven display device may be an electronic paper.

In accordance with still another aspect of the present disclosure, there is provided an operation method of an electric-field-driven cell including first and second electrodes spaced from each other and an actuator which moves between the electrodes. Further, a position of the actuator may be controlled by applying a DC voltage or a pulse voltage to the first electrode or the second electrode.

The position of the actuator may be controlled by adjusting magnitude of the DC voltage applied to the first electrode or the second electrode. Alternatively, the position of the actuator may be controlled by adjusting magnitude, an electric potential change speed, a waveform of a pulse, and duration of a pulse of the pulse voltage applied to the first electrode or the second electrode.

The position of the actuator may be controlled by applying the DC voltage or the pulse voltage to the electrode opposite to a position where the actuator is to be positioned. Desirably, the electric potential change speed of the pulse voltage may be higher than or equal to a redistribution speed of charges in the actuator.

The waveform of the pulse of the pulse voltage may be any one selected from a rectangular wave, a sine wave, and a pyramidal wave but they are merely examples. The pulse waveform is not limited thereto and may have various modified shapes.

In accordance with the present disclosure configured as described above, there is provided an electric-field-driven cell which can reduce a driving voltage, can be driven at a high speed and can express color by adjusting an electric potential and a position of the actuator by using a DC voltage or a pulse voltage and an actuator which does not have permanent electric charges.

The electric-field-driven cell of the present disclosure can be used in various fields such as an optical switch, an electric switch and a display, and particularly, it can be applied to a reflective type electronic paper display device.

BRIEF DESCRIPTION OF DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

MODE FOR THE INVENTION

Hereinafter, embodiments of the present disclosure will be described in detail with reference to the accompanying drawings.

Figure 1:
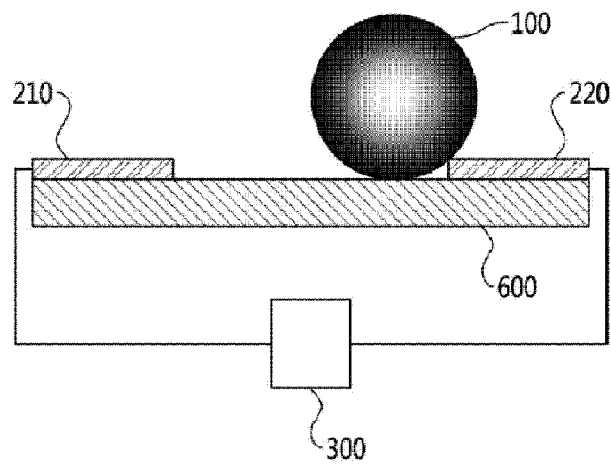
FIG. 1 shows a configuration of an electric-field-driven cell in accordance with an embodiment of the present disclosure.
Figure 2:
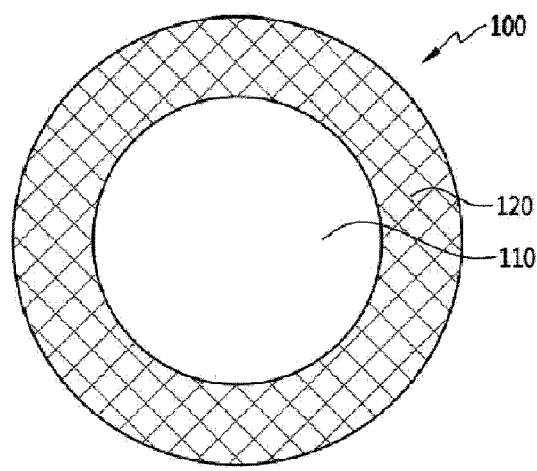
FIGS. 2 to 4 are cross-sectional views of an actuator used in an electric-field-driven cell of the present disclosure.
Figure 3:
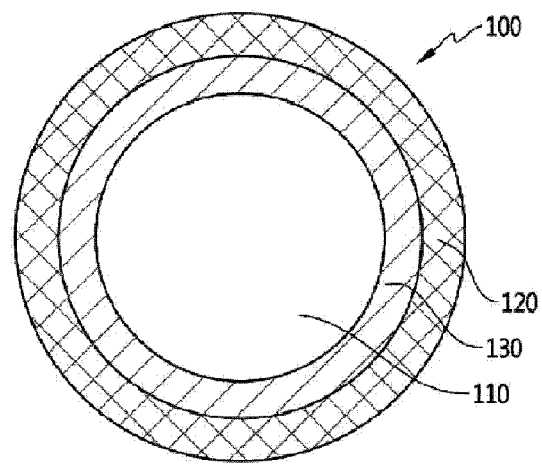
Figure 4:
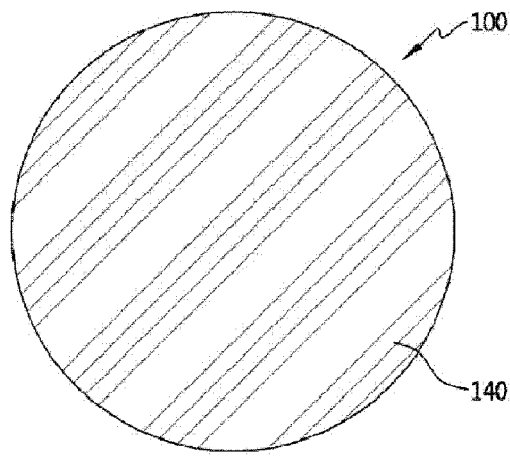

FIG. 1 shows a configuration of an electric-field-driven cell in accordance with an embodiment of the present disclosure, and FIGS. 2 to 4 are cross-sectional views of an actuator used therein.

An electric-field-driven cell may include a first electrode 210, a second electrode 220, an actuator 100, and a controller 300.

The first electrode 210 and the second electrode 220 are spaced from each other and placed on a substrate 600.

The substrate 600 may be a transparent substrate formed of glass or a flexible substrate, and the first electrode 210 and the second electrode 220 may be formed of a transparent conductive material such as ITO (indium tin oxide) or IZO (indium zinc oxide), an opaque conductive material such as Cr, Al, and Mo, or a conductive polymer such as a PEDOT compound.

The first electrode 210 and the second electrode 220 protrude on the substrate 600 and are brought into direct contact with the actuator 100. A gap between the first electrode 210 and the second electrode 220 is varied depending on a purpose of a device to which the electric-field-driven cell is applied.

The actuator 100 can move between the first electrode 210 and the second electrode 220. The actuator 100 does not have permanent electric charges and can be positively or negatively charged for a time period depending on a state of an applied voltage.

The actuator 100 has a high contact resistance to the first electrode 210 or the second electrode 220 for the reason to be mentioned below. In order to have a high contact resistance, the actuator 100 is formed into a spherical shape or a cylindrical shape. Since the spherical-shaped actuator 100 is brought into point-contact with the first electrode 210 or the second electrode 220, the spherical-shaped actuator 100 has a small contact area with the first electrode 210 or the second electrode 220. Accordingly, a contact resistance is high, and, thus, it is possible to maintain the actuator 100 in an insulated state for a required time period. Although not illustrated, since a cylindrical-shaped actuator may be brought into point-contact or line-contact with the first electrode 210 or the second electrode 220, it also has a small contact area. Accordingly, the cylindrical-shaped actuator may moves in substantially the same manner as the spherical-shaped actuator 100.

Further, a size of the actuator 100 is equal to or smaller than the gap between the first electrode 210 and the second electrode 220, and a diameter of the actuator 100 may be in the range of from about several micrometer to about several tens micrometer.

The actuator 100 does not have permanent electric charges, but it needs to be made of a conductive material to be positively or negatively charged by an electrode. However, since electric charges may be positioned at a surface area of the electrically charged actuator 100, the entire part of the actuator 100 need not be made of a conductive material. Accordingly, as depicted in FIG. 2, the actuator 100 may have a configuration in which an insulating base 110 is coated with a conductive material so as to form a conductive layer 120 thereon. A thickness of the conductive layer 120 may be in the range of from about 10 Å to about 10,000 Å depending on a size of the insulating base 110. The thickness of the conductive layer 120 can be determined based on a ratio to a diameter of the insulating base 110. In an example actuator 100, the insulating base 110 was coated with the conductive layer 120 having a thickness of, but not limited to, about 20% of the diameter of the insulating base 110.

Since a driving force required to drive the actuator 100 and a driving speed of the actuator 100 are in inverse proportion to a weight of the actuator 100, the insulating base 110 is made of a polymer material having a low weight and dielectric characteristics.

The conductive layer 120 may be made of metal having good electric characteristics such as gold and aluminum or a conductive material such as a transparent conductive oxide or a conductive polymer.

A color of the actuator 100 can be important depending on a technical field in which the electric-field-driven cell is used. For this reason, an actuator 100 illustrated in FIG. 3 further includes a color layer 130.

The color layer 130 may have any one color selected from a group including white, red, green, blue, yellow, magenta, cyan or any arbitrary color and may be made of a non-transmissive black material to prevent reflection of a light.

In the actuator 100 including this color layer 130, the conductive layer 120 may be made of a transparent conductive material such as ITO, IZO, ZnO, and SnO$_2$ so as to show the color of the color layer 130.

In FIG. 4, there is illustrated an actuator 100, the entire part of which is made of a semiconductor material 140. If the actuator 100 is made of the material 140 having semiconductor properties such as a metal oxide or silicon, induced charges may exist on its surface by an electric field applied thereto due to its semiconductor properties. Accordingly, the semiconductor actuator 100 may show the same characteristics as the actuator coated with the conductive material.

For the same reason, the conductive layer 120 of the actuator illustrated in FIG. 2 or FIG. 3 can be replaced with the semiconductor material. By way of example, representative metal oxides having semiconductor properties are ZnO and SnO.

The controller 300 is connected to the first electrode 210 and the second electrode 220 and controls a voltage applied to the first electrode 210 and the second electrode 220. Further, the controller 300 applies a DC voltage or a pulse voltage to the electrodes and controls a magnitude of the voltage, an electric potential change speed of the voltage, a waveform of a pulse of the voltage, and duration of a pulse of the voltage.

Hereinafter, there will be explained an operation method for the electric-field-driven cell illustrated in FIG. 1. The present method will be described for a case where the actuator 100 is brought into contact with the second electrode 220 in the initial stage.

In the electric-field-driven cell configured as shown in FIG. 1, if a potential difference is generated by applying a voltage to the first electrode 210 and the second electrode 220, the actuator 100 which does not have permanent electric charges is charged with electricity by a transfer of charges from the second electrode 220 to the actuator 100.

When an electric potential of the actuator 100 electrically charged by the second electrode 220 becomes equal to an electric potential of the second electrode 220, an electric force between the second electrode 220 and the actuator 100 is not exerted, and the actuator 100 is moved toward the first electrode 210 by an electric force between the first electrode 210 and the actuator 100.

The actuator 100 moved toward the first electrode 210 is brought into contact with the first electrode 210. Then, the actuator 100 has an electric potential equal to that of the first electrode 210. Consequently, the electric force between the first electrode 210 and the actuator 100 is not exerted, and the actuator 100 is moved again toward the second electrode 220 by an electric force between the second electrode 220 and the actuator 100. In this way, the actuator 100 continuously reciprocates between two electrodes.

However, the electric-field-driven cell in accordance with the present embodiment has a small contact area between the actuator 100 and the electrode 210 or 220 and, thus, the electric-field-driven cell has a very high contact resistance. Accordingly, the actuator 100 may be in a nearly insulated state with respect to the electrode. The actuator 100 in the insulated state may have a temporarily floating potential which is changed by an electric potential applied to the electrodes 210 and 220.

Here, if the electric potential applied to the electrodes 210 and 220 is not changed until redistribution of charges is completed in the actuator 100 in a temporarily floating state, the actuator 100 in which the redistribution of charges is completed may have a floating potential at a certain value between the electric potentials of the electrodes 210 and 220. Since an electric force between the adjacent second electrode 220 and the actuator 100 is stronger than an electric force between the first electrode 210 and the actuator 100, the actuator 100 stops at a position of the second electrode 220.

Meanwhile, if the electric potential applied to the electrodes 210 and 220 is changed before the redistribution of charges is completed in the actuator 100 in the temporarily floating state, a potential difference between the actuator 100 in which the redistribution of charges is not completed and the second electrode 220 adjacent thereto may be 0 or close to 0. Accordingly, a relatively high potential difference is generated between the first electrode 210 and the actuator 100, and, thus, the electric forces between the electrodes 210 and 220 and the actuator 100 becomes changed. Consequently, the actuator 100 is not influenced by the electric force of the second electrode 220 and it is moved toward the first electrode 210 by the electric force of the first electrode 210.

In short, if a constant voltage or a voltage which changes in a shorter time than a redistribution time of surface charges in the actuator 100 is applied to an electrode toward which the actuator 100 in the temporarily floating state is controlled to move or an electrode at which the actuator 100 is located, an electric force as an attractive force is generated between the actuator 100 and the electrode toward which the actuator 100 is controlled to move, and, thus, a position of the actuator 100 can be adjusted.

Here, a pulse voltage can be applied to the electrodes 210 and 220 to change a voltage applied to the electrodes 210 and 220 quickly before the redistribution of charges is completed in the actuator 100.

As described above, the electric-field-driven cell in the present embodiment uses a pulse voltage and the actuator 100 which does not have permanent electric charges and includes therein the insulating base made of a polymer material, and, thus, it can be driven with a low driving voltage at a high response speed.

Figure 5:
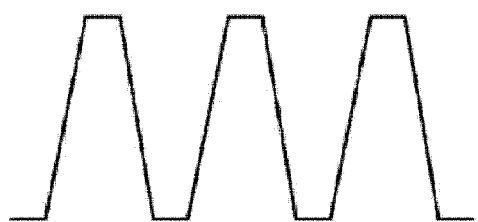
FIG. 5 shows an example of a pulse waveform of a voltage applied to an electrode of an electric-field-driven cell of the present disclosure.
Figure 5:
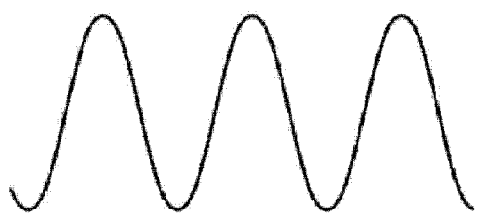

As depicted in FIG. 5, the pulse voltage may be a rectangular wave in which a time taken for a voltage to rise or fall is 0 or close to 0 or the pulse voltage may be a sine wave in which a voltage is changed in a curve. An electric potential change speed can be represented by an inclination of a pulse wave of the pulse voltage, and the electric potential change speed of the electrodes 210 and 220 needs to be higher than or equal to a redistribution speed of charges in the surface of the actuator 100.

This can be achieved by applying a DC voltage to the electrodes 210 and 220. If the actuator 100 is located at the second electrode 220, a floating potential may be defined by a magnitude of an electric field applied to the second electrode 220 and an application time. In this case, if an attractive force between the floating potential of the actuator 100 and the electric field applied to the second electrode 220 is not exerted, an electric force is generated between the floating potential of the actuator 100 and an electric field applied to the first electrode 210, and, thus, the actuator 100 is moved toward the first electrode 210.

An application method of the electric fields to the first electrode 210 and the second electrode 220 may be any types as shown below, and any type of the method may be applied to any configuration of an electric-field-driven cell to which the present disclosure can be applied.

TABLE 1

| Classification | First electrode 210 | Second electrode 220 |
| --- | --- | --- |
| Method 1 | DC | DC |
| Method 2 | Pulse | DC |

TABLE 1-continued

| Classification | First electrode 210 | Second electrode 220 |
|---|---|---|
| Method 3 | DC | Pulse |
| Method 4 | Pulse | Pulse |

FIGS. 6 to 10 show electric-field-driven cells in accordance with other embodiments of the present disclosure. Components assigned with same reference numerals are the same components, and redundant explanation thereof will be omitted.

Figure 6:
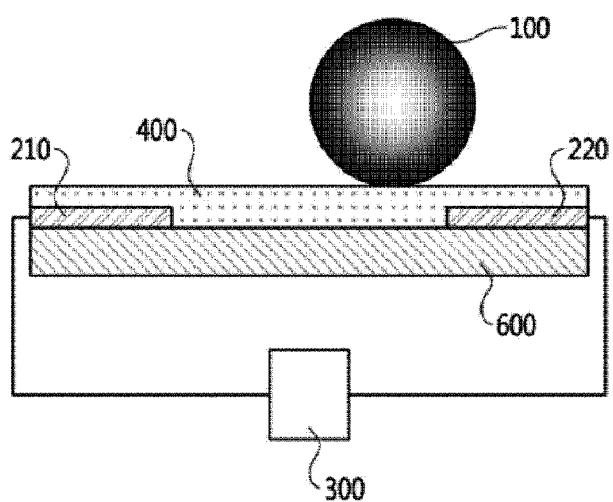
FIGS. 6 to 10 show configurations of electric-field-driven cells in accordance with other embodiments of the present disclosure.

In an electric-field-driven cell illustrated in FIG. 6, an insulating layer 400 is formed such that a first electrode 210 and a second electrode 220 are not brought into contact with an actuator 100. In the embodiment illustrated in FIG. 6, the first electrode 210 and the second electrode 220 are positioned on the same layer, but these electrodes may be separated by the insulating layer 400 and any one of them may be positioned on another layer.

In this configuration, the electrodes 210 and 220 are not brought into contact with the actuator 100, and, thus, an electric potential of the actuator 100 cannot be defined accurately. Nonetheless, the electric potential of the actuator 100 may have a certain value between the electric potentials of the electrodes 210 and 220, and, thus, the position of the actuator 100 can be adjusted by controlling the magnitude of the DC or pulse voltage applied to the electrodes 210 and 220 and the electric potential change speed of the pulse voltage.

Figure 7:
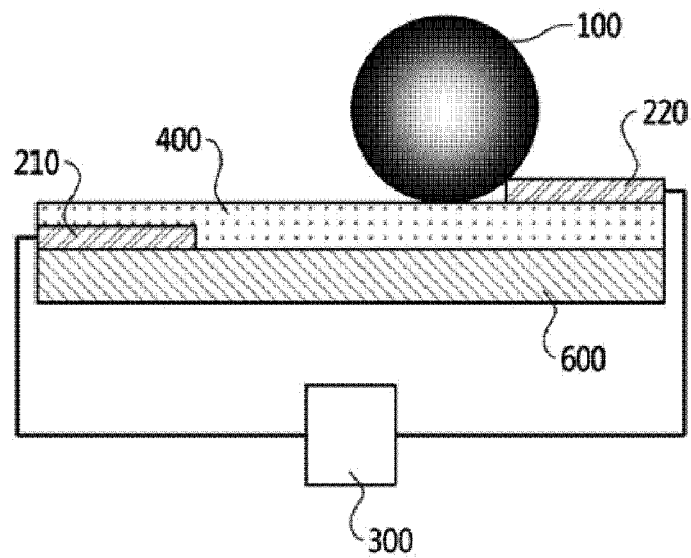

In an electric-field-driven cell illustrated in FIG. 7, an insulating layer 400 is formed such that a first electrode 210 is not brought into contact with an actuator 100 and a second electrode 220 is brought into direct contact with the actuator 100. Since the second electrode 220 is brought into direct contact with the actuator 100, the electric potential of the actuator 100 can be adjusted accurately. The electric-field-driven cell can be operated by the above-described application method of the electric field. If the position of the actuator 100 is located at the second electrode 220 and enough time goes by, the electric potentials of the actuator 100 and the second electrode 220 become equal to each other and the position of the actuator 100 is readily moved toward the first electrode 210. Consequently, the position of the actuator 100 is located at the first electrode 210 at unwanted time.

Figure 8:
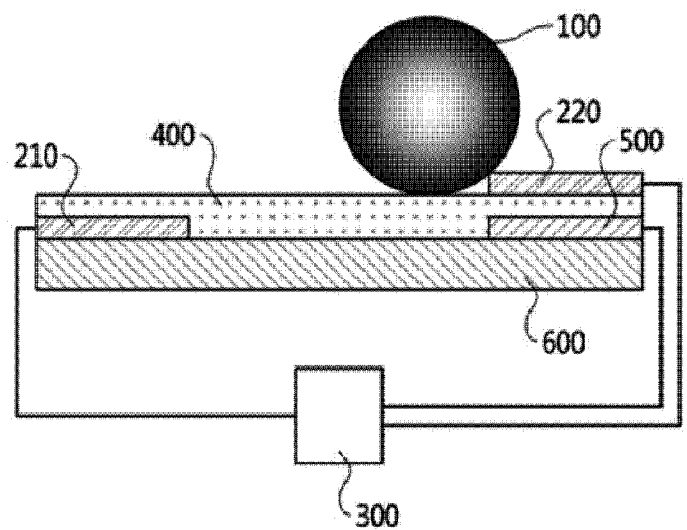

In order to solve such a problem, as shown in an electric-field-driven cell illustrated in FIG. 8, the electric-field-driven cell illustrated in FIG. 7 is further provided with a control electrode 500 on the side of the second electrode 220. The control electrode 500 is not brought into contact with the actuator 100 and insulated from the second electrode 220. The control electrode 500 maintains the actuator 100 at the position of the second electrode 220 by an electric force for a required time, whereby it is possible to obtain a memory effect required for an electronic paper display. Any one of a DC voltage and a pulse voltage can be applied to the control electrode 500 in order to obtain the memory effect.

Figure 9:
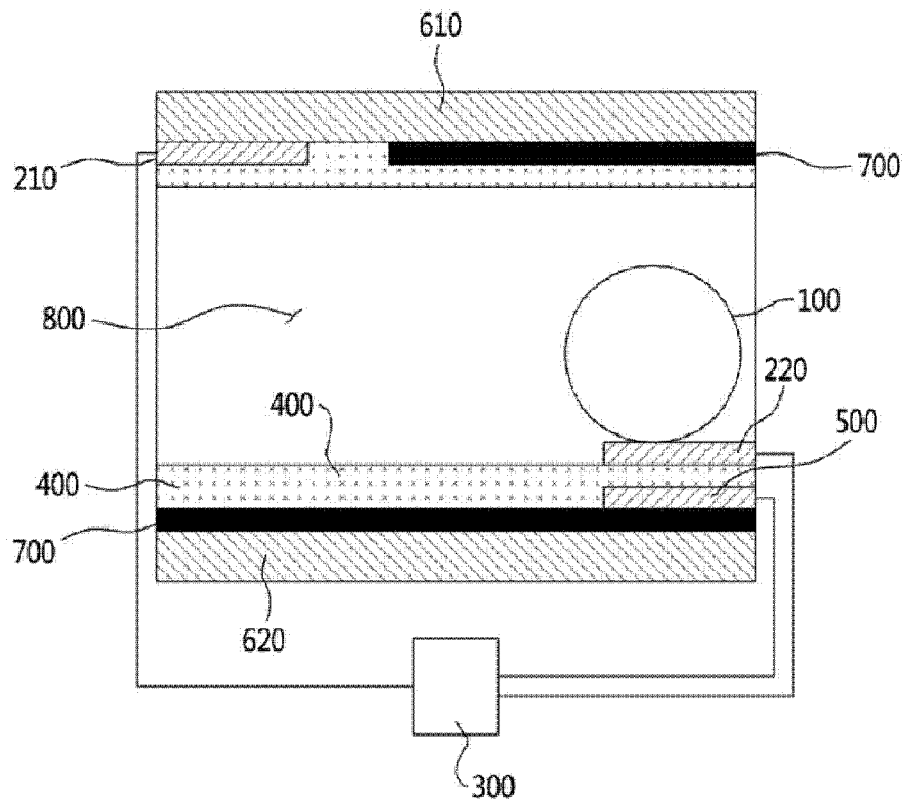
Figure 10:
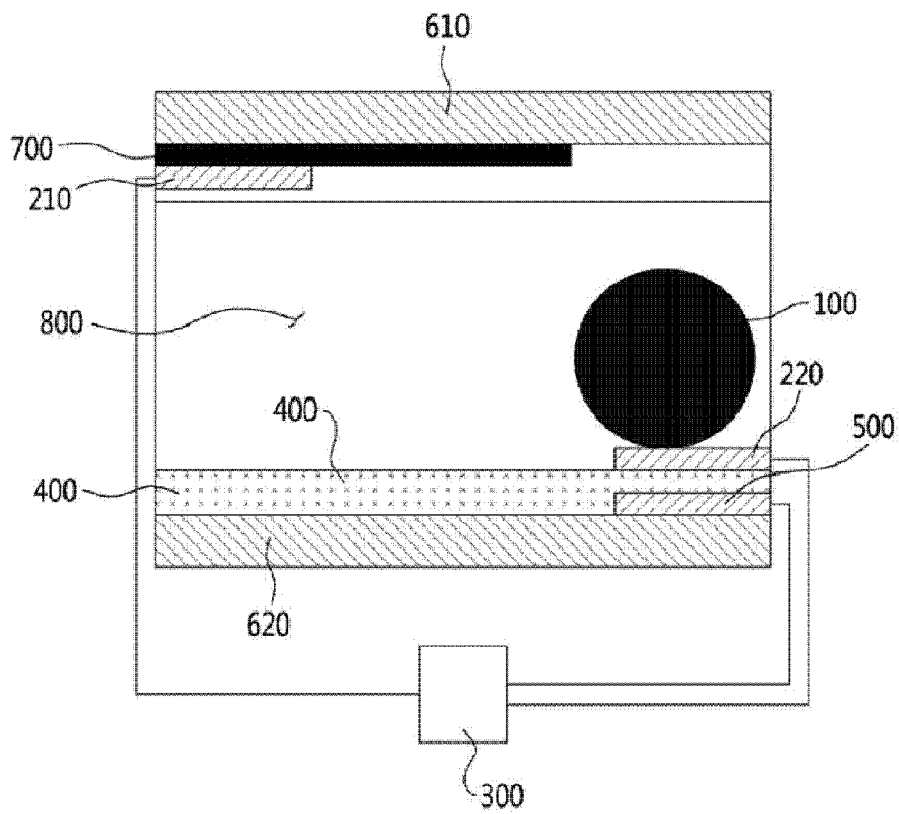

An electric-field-driven cell illustrated in FIG. 9 or FIG. 10 has a configuration similar to that of FIG. 7, but it is a kind of electric-field-driven cell for vertical driving or diagonal driving instead of horizontal driving and can be applied to a reflective type electronic paper display or a transmissive type electronic paper display.

In this configuration, a first electrode 210 and a second electrode 220 are respectively placed on separate substrates 610 and 620 facing each other, the first electrode 210 and the second electrode 220 are positioned so as not to face each other, and an actuator 100 is positioned in a driving space 800 formed between the separate substrates 610 and 620 facing each other. In this structure, a lower driving voltage is expected to be needed and an aperture area can be improved, as compared to the horizontal structure.

Particularly, the electric-field-driven cell for a reflective type display further includes a light absorption layer 700 and a configuration of the cell varies depending on whether the actuator 100 is a reflector which reflects light or an absorber which absorbs light.

In the electric-field-driven cell illustrated in FIG. 9, the actuator 100 is a reflector coated with white or another color. An upper substrate 610 and the first electrode 210 to/from which light is incident and emitted after being reflected need to be made of transparent materials. The second electrode 220 can be made of any one of a transparent conductive material and an opaque conductive material, but the light absorption layer 700 is formed on a lower substrate 620 in order to prevent light from being reflected from the lower substrate 620. In the upper substrate 610, the light absorption layer 700 is formed at a part, where the first electrode 210 is not placed, facing the second electrode 220. Therefore, as depicted in the drawing, if the actuator 100 is positioned on the side of the second electrode 220, the actuator 100 does not reflect light, and, thus, a black color appears when viewed from the outside. On the contrary, if the actuator 100 is moved toward the first electrode 210 by an electric field, the actuator 100 reflects light and white color or another color coated on the actuator 100 appears when viewed from the outside.

In the electric-field-driven cell illustrated in FIG. 10, the actuator 100 is an absorber which has a black color and absorbs light.

The upper substrate 610 to which light is incident needs to be made of a transparent material. Since the second electrode 220 serves as a reflector, it may be made of a conductive material having a good reflective property such as aluminum and silver. The light absorption layer is not formed on the lower substrate 620. Meanwhile, the light absorption layer 700 is formed on the upper substrate 610 only on the side of the first electrode 210. Therefore, if the actuator 100 which absorbs light is located on the side of the second electrode 220 as depicted in the drawing, the actuator 100 prevents light from being reflected from the second electrode 220 and the black color appears when viewed from the outside. On the contrary, if the actuator 100 is moved toward the first electrode 210 by an electric field, the light reflected from the second electrode 220 appears when viewed from the outside. At this time, in order to express color, the second electrode 220 may be coated with color or a color layer may be positioned under the transparent second electrode 220.

An electric-field-driven device configured in an array including a plurality of electric-field-driven cells of the present disclosure can be applied to an optical switch, an electric switch or a display device, and particularly to electronic paper.

If the electric-field-driven cell of the present disclosure is applied to electronic paper which expresses black and white, the actuator 100 may have a white color or a black color.

Otherwise, if it is applied to electronic paper which expresses colors, the actuator 100 may have various colors, and, thus, an additional color filter may not be used. In case of expressing various colors according to a principle of an additive color mixture, the actuator 100 may have colors of red, green, and blue and in case of expressing various colors according to a principle of a subtractive color mixture, the actuator 100 may have colors of yellow, magenta and cyan. Further, all actuators having the above-described six colors can be used, and at least one actuator having the above-described colors and an actuator having a white color or a black color can be used together.

The above description of the present disclosure is provided for the purpose of illustration, and it would be understood by those skilled in the art that various changes and modifications may be made without changing technical conception and essential features of the present invention. Thus, the scope of the present invention is defined by the following claims rather than by the detailed description of the embodiment. It shall be understood that all modifications and embodiments conceived from the meaning and scope of the claims and their equivalents are included in the scope of the present invention.

The invention claimed is:

1. A cell driven by an electric field, the cell comprising: a first electrode and a second electrode spaced from each other; and an actuator moving between the first electrode and the second electrode, wherein the actuator does not have permanent electric charges, and a DC voltage or a pulse voltage is applied to the first electrode and the second electrode,
wherein the actuator includes an insulating base coated with a conductive material or a semiconductor material.

2. The cell of claim 1, wherein a position of the actuator is controlled by adjusting magnitude of the DC voltage applied to the first or second electrode or at least one of magnitude, a waveform of a pulse, and duration of a pulse of the pulse voltage applied to the first or second electrode.

3. The cell of claim 2, further comprising: a controller which controls the magnitude of the DC voltage applied to the first or second electrode or the magnitude, the waveform of the pulse, and the duration of the pulse of the pulse voltage applied to the first or second electrode.

4. The cell of claim 1, wherein the actuator is positively or negatively charged.

5. The cell of claim 4, wherein the actuator is formed into a spherical shape or a cylindrical shape.

6. The cell of claim 5, wherein the actuator is made of a semiconductor material.

7. The cell of claim 5, wherein the actuator includes an insulating base, a color layer coating the insulating base, and a transparent conductive layer coating the color layer.

8. The cell of claim 1, wherein the first electrode and the second electrode are brought into direct contact with the actuator.

9. The cell of claim 8, wherein the first electrode and the second electrode are respectively placed on separate substrates facing each other, the first electrode and the second electrode are positioned so as not to face each other, and the actuator is positioned in a driving space formed between the two substrates facing each other and moves between the first electrode and the second electrode.

10. The cell of claim 9, wherein an upper substrate on which the first electrode is placed and the first electrode is made of transparent materials, a light absorption layer is formed at a portion of the upper substrate on which the first electrode is not placed, and a light absorption layer is formed on an overall lower substrate on which the second electrode is placed.

11. The cell of claim 9, wherein an upper substrate on which the first electrode is placed is made of a transparent material, and a light absorption layer is formed at a portion of the upper substrate on which the first electrode is placed.

12. The cell of claim 1, further comprising: an insulating layer by which the first electrode and the second electrode are not brought into contact with the actuator.

13. The cell of claim 1, further comprising: an insulating layer by which one of the first and second electrodes is not brought into contact with the actuator.

14. The cell of claim 1, wherein the second electrode is brought into direct contact with the actuator, and the cell further comprises: a control electrode provided on the side of the second electrode; and an insulating layer by which the control electrode is not brought into contact with the second electrode and the actuator.

15. An electric-field-driven device comprising a plurality of cells as claimed in claim 1.

16. The electric-field-driven device of claim 15, wherein the electric field-driven device is a display device.

17. The electric-field-driven device of claim 16, wherein the electric-field-driven display device is an electronic paper.

18. An operation method of an electric-field-driven cell including first and second electrodes spaced from each other and an actuator which moves between the electrodes and does not have permanent electric charges, the method comprising: controlling a position of the actuator by applying a DC voltage or a pulse voltage to the first electrode or the second electrode,
wherein the actuator includes an insulating base coated with a conductive material or a semiconductor material.

19. The operation method of claim 18, wherein the position of the actuator is controlled by adjusting magnitude, a waveform of a pulse, and duration of a pulse of the pulse voltage applied to the first electrode or the second electrode.

20. The operation method of claim 18, wherein the position of the actuator is controlled by adjusting magnitude of the DC voltage applied to the first electrode or the second electrode.

21. The operation method of claim 20, wherein the DC voltage or the pulse voltage is applied to the electrode opposite to a position where the actuator is to be positioned.

22. The operation method of claim 21, wherein the waveform of the pulse of the pulse voltage is any one selected from a rectangular wave, a sine wave, and a pyramidal wave.

* * * * *